UNITED STATES PATENT OFFICE.

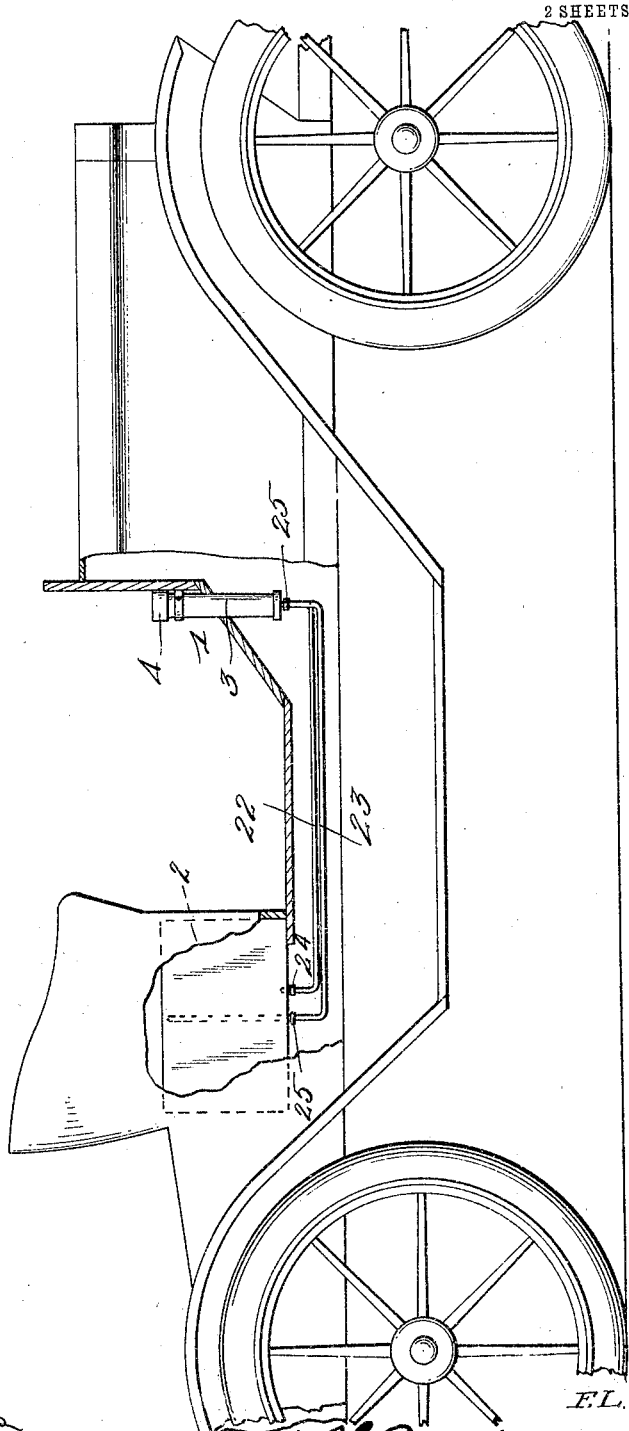

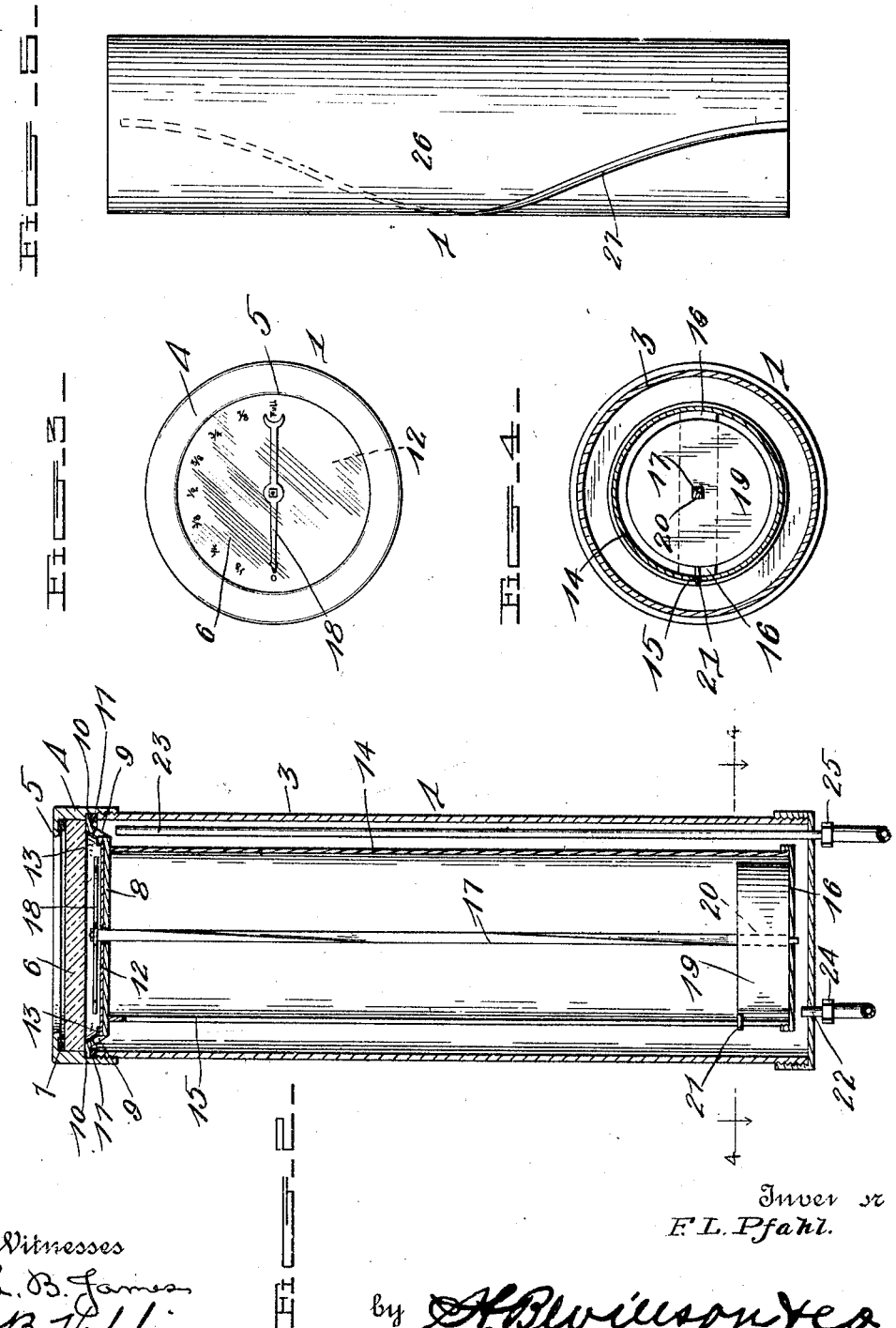

FREDERICK L. PFAHL, OF AKRON, OHIO.

INDICATOR FOR LIQUID-CONTAINERS.

1,013,309.  Specification of Letters Patent.   Patented Jan. 2, 1912.

Application filed February 6, 1911. Serial No. 606,947.

*To all whom it may concern:*

Be it known that I, FREDERICK L. PFAHL, a citizen of the United States, residing at Akron, in the county of Summit and State of Ohio, have invented certain new and useful Improvements in Indicators for Liquid-Containers; and I do declare the following to be a full, clear, and exact description of the invention, such as will enable others skilled in the art to which it appertains to make and use the same.

This invention relates to improvements in indicators for liquid containing tanks or vessels.

One object of the invention is to provide an indicator of this character having an improved construction and arrangement of operating mechanism whereby the level of the liquid in the container will be accurately indicated.

Another object is to provide an indicator for liquid containing tanks adapted to be operated at any distance from the tank and which is particularly adapted for use in connection with the gasolene tanks of automobiles whereby the operator may tell at a glance the condition of the gasolene in the tank.

With these and other objects in view, the invention consists of certain novel features of construction, combination and arrangement of parts as will be more fully described and particularly pointed out in the appended claim.

In the accompanying drawings: Figure 1 is a side view of an automobile having my invention applied thereto, parts of the automobile being broken away and in section; Fig. 2 is a central vertical sectional view of the indicator; Fig. 3 is a top plan view thereof; Fig. 4 is a horizontal sectional view on the line 4—4 of Fig. 2; Fig. 5 is a side view of a modified form of the indicator operating mechanism.

Referring more particularly to the drawings, 1 denotes my improved indicator and 2 denotes the tank to which the same is connected. The tank 2 in the present instance is shown as a gasolene tank located beneath the seat of an automobile while the indicator 1 is located adjacent the dash board of the machine and has its lower end projecting below the floor of the latter.

The indicator 1 comprises a tank 3 which may be of any suitable size and shape and which is here shown as of cylinder form. The upper end of the tank 3 is closed by a screw cap 4 having arranged therein a view opening 5 covered by a glass plate 6. Between the plate and the edge of the opening in the cap is arranged a gasket or washer 7 whereby a fluid tight engagement is formed between these parts.

Arranged in the upper end of the tank 3 below the glass plate 6 is a dial supporting plate 8 having on its outer edge an upwardly and outwardly inclined annular flange 9 on the upper edge of which is an annular radially projecting flange 10. The flange 10 is engaged with the upper edge of the tank and clamped between said edge and an annular offset or shoulder formed on the inner side of the cap. Between the flange 10 and the upper edge of the cylinder is arranged a washer 11 whereby a fluid tight connection is formed between these parts.

Arranged on the plate 8 is a dial 12 having thereon a scale indicating the quantity of liquid which may be in the tank 2. The dial plate may be secured to the plate 8 in any suitable manner but is preferably secured by lugs 13 cut from the side flanges of the plate and bent over into engagement with the dial as shown. Secured to the under side of the plate 8 and projecting down into the tank 3 is a float guiding tube 14 in one side of which is formed a vertically disposed slot 15. On the lower end of the tube is arranged a bearing plate 16.

In the plate 16 is revolubly mounted an upwardly projecting float operated shaft 17 the upper end of which projects through the plate 8 and dial 12. On the upper end of the shaft 17 is fixedly mounted an indicating finger or pointer 18 which is adapted to coact with the scale on the dial plate. The shaft 17 is rectangular in cross section and is twisted so that the sides and corners are in spiral form.

Arranged in the tube 14 is a float 19 in which is formed a centrally disposed rectangular passage 20 whereby the float is slidably engaged with the shaft 17. On one side of the float is formed a radially projecting finger 21 which slidably engages the slot 15 in the tube 14 whereby the float is held against rotation but is permitted to freely rise and lower in the tube with the rise and fall of the liquid in the tanks 1 and 3. In thus rising and lowering, the float will revolve the shaft 17 by reason of its spiral formation and the sliding engagement of the float therewith as will be readily understood. When the shaft is thus operated the pointer 18 will be revolved in one direction or the other and will co-act with the scale on the dial plate to indicate the quantity of liquid in the tanks.

The tank 3 is connected at its lower end by a liquid conducting pipe 22 to the bottom of the tank 2 whereby the liquid in said tanks may equalize or seek its level. The upper end of the tank 3 is also connected to the upper portion of the tank 2 by an air conducting tube 23 whereby the pressure of air in the upper portion of both tanks will be the same thus providing for the accurate operation of the indicator when the liquid in the tank 1 is under pressure. The air tube or pipe 23 may be connected directly to the tops of the tanks or may enter the bottoms of the same and project upwardly above the level of the liquid therein as shown in the drawings. The ends of the pipe 22 are connected to nipples in the bottom of the tanks by unions 24 while the portion of the air pipe 23 between the tanks is connected by unions 25 to the portions of said pipe in the tanks.

In Fig. 5 of the drawings is shown a slightly modified form of float guiding tube 26 in which the float guiding slot 27 is in spiral form. In this form of the tube the float operated shaft is straight throughout its entire length and is turned to operate the pointer by movement of the float, the latter being turned by the engagement of the finger thereon with the spiral slot 27.

By means of an indicating mechanism such as herein described, the condition of the liquid in a tank may be accurately indicated regardless of the position or distance between the tank and indicator.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined in the appended claim.

Having thus described my invention, what I claim is:

In an indicator of the character described, the construction of a cylinder, a dial supporting plate closing the upper end of the latter, a tube secured to and depending from said plate, a float slidably located in the tube, means for preventing rotation of the float, a shaft journaled in the supporting plate and lower end of the tube and passing through the float and coöperating therewith, whereby the shaft is rotated during the vertical travel of the float, a pointer carried by the upper projecting end of the shaft, a transparent cover for said cylinder, a liquid fluid tank, a pipe connecting the bottom of the latter with the bottom of the cylinder, and an air pipe leading from the top of the tank and communicating with the top of the cylinder.

In testimony whereof I have hereunto set my hand in presence of two subscribing witnesses.

FREDERICK L. PFAHL.

Witnesses:
E. E. OTIS,
M. R. KINNEY.